United States Patent [19]

Zurstadt et al.

[11] Patent Number: 5,583,323
[45] Date of Patent: *Dec. 10, 1996

[54] CALIBRATION OF GRAPHIC DATA-ACQUISITION TRACKING SYSTEM

[75] Inventors: Donald H. Zurstadt, Sherwood; Samuel W. Mallicoat, Portland; Scott E. Wilson, Sherwood, all of Oreg.

[73] Assignee: Microfield Graphics, Inc., Beaverton, Oreg.

[*] Notice: The term of this patent shall not extend beyond the expiration date of Pat. No. 5,434,370.

[21] Appl. No.: 147,977

[22] Filed: Nov. 5, 1993

[51] Int. Cl.$^6$ .................................................. G08C 21/00
[52] U.S. Cl. ............................................. 178/18; 345/179
[58] Field of Search ....................... 178/18, 19; 345/173, 345/175; 359/222, 223; 382/3, 13; 364/709.3

[56] References Cited

U.S. PATENT DOCUMENTS

| | | |
|---|---|---|
| Re. 33,936 | 5/1992 | Miyamori et al. . |
| 3,184,847 | 5/1965 | Rosen . |
| 3,457,646 | 7/1969 | Schwemin . |
| 3,543,240 | 11/1970 | Miller et al. . |
| 3,553,680 | 1/1971 | Cooreman . |
| 3,609,237 | 9/1971 | Gerber . |
| 3,613,066 | 10/1971 | Cooreman . |
| 3,709,602 | 1/1973 | Satomi . |
| 3,733,979 | 5/1973 | England . |
| 3,752,558 | 8/1973 | Lloyd . |
| 3,775,560 | 11/1973 | Ebeling et al. . |
| 3,783,445 | 1/1974 | Penwarden . |
| 3,818,133 | 6/1974 | Cotter . |
| 3,873,770 | 3/1975 | Ioannou . |
| 3,898,445 | 8/1975 | MacLeod et al. . |
| 3,944,740 | 3/1976 | Murase et al. . |
| 4,078,151 | 3/1978 | McNeary et al. . |
| 4,104,617 | 8/1978 | Bean et al. . |
| 4,125,743 | 11/1978 | O'Boyle et al. . |
| 4,181,952 | 1/1980 | Casey et al. . |

(List continued on next page.)

FOREIGN PATENT DOCUMENTS 1575420  9/1980  United Kingdom .

OTHER PUBLICATIONS

Optical Devices: Lasers; National Aeronautics and Space Administration.
Polyvision; manufactured by Polytronix, Inc.
Pinpointing Coordinates with Laser Beam Scanning; Position feedbak opens up applications from the classroom to the surgical suite; by Gerald F. Marshall, Jagmohan S. Gadhok and John L. Junkins.
Electronic Blackboard Technology; Manufactured by Digital Scanning Systems.

*Primary Examiner*—Wellington Chin
*Assistant Examiner*—Paul Loomis
*Attorney, Agent, or Firm*—Kolisch, Hartwell, Dickinson, McCormack & Heuser

[57] ABSTRACT

A system and method for calibrating and monitoring the height of an electromagnetic radiation expanse above a writing surface is described. An electromagnetic-radiation-generating structure is disposed adjacent produce an expanse of radiation in a substantially planar zone near the writing surface. At least one object is located at a first point in the zone remote from the structure. The object is capable of interacting with the expanse to effect the production of quantitative data correlating to the relative distance between the expanse and the writing surface at the first point. A processor receives and processes the data and allows the position of the expanse relative to the writing surface to be monitored. In a preferred embodiment, four calibration strips are placed near the corners of a writing surface in a system employing two beam-generating scanners to provide X, Y and Z information concerning the location of a writing implement relative to a writing surface. Each of the calibration strips has a "Z" pattern of slots which allow quantitative reflectance information to be produced when the laser beam impinges the face of the strip at a preferred angle of approximately ninety (90) degrees. The strip also has a pair of angled slots which are designed to interact with a diagonally impinging beam which is out of alignment, i.e., too low or too high above the writing surface.

18 Claims, 3 Drawing Sheets

U.S. PATENT DOCUMENTS

| | | |
|---|---|---|
| 4,198,623 | 4/1980 | Misek et al. . |
| 4,205,304 | 5/1980 | Moore . |
| 4,206,314 | 6/1980 | Prugh et al. . |
| 4,213,005 | 7/1980 | Cameron . |
| 4,227,044 | 10/1980 | Fencl . |
| 4,237,617 | 12/1980 | Goussios . |
| 4,277,783 | 7/1981 | Sampieri et al. . |
| 4,294,543 | 10/1981 | Apple et al. . |
| 4,317,956 | 3/1982 | Torok et al. . |
| 4,318,096 | 3/1982 | Thornburg et al. . |
| 4,342,910 | 8/1982 | Pfeifer et al. . |
| 4,345,313 | 8/1982 | Knox . |
| 4,380,076 | 4/1983 | Bethune . |
| 4,386,346 | 5/1983 | Levine . |
| 4,501,931 | 2/1985 | Ohya et al. . |
| 4,504,910 | 3/1985 | Araki et al. . |
| 4,553,842 | 11/1985 | Griffin . |
| 4,553,892 | 11/1985 | Griffin ................................ 345/175 X |
| 4,558,313 | 12/1985 | Garwin et al. . |
| 4,568,182 | 2/1986 | Modjallal . |
| 4,642,422 | 2/1987 | Garwin et al. . |
| 4,670,751 | 6/1987 | Enokido et al. . |
| 4,688,900 | 8/1987 | Doane et al. . |
| 4,688,933 | 8/1987 | Lapeyre ............................ 345/175 X |
| 4,711,977 | 12/1987 | Miyamori et al. . |
| 4,772,763 | 9/1988 | Garwin et al. . |
| 4,777,329 | 10/1988 | Mallicoat . |
| 4,786,891 | 11/1988 | Ueda et al. . |
| 4,812,940 | 3/1989 | Takenaga . |
| 4,832,144 | 5/1989 | Murakami et al. . |
| 4,901,073 | 2/1990 | Kibrick . |
| 4,938,570 | 7/1990 | Majima et al. . |
| 4,944,576 | 7/1990 | Lacker et al. . |
| 4,994,204 | 2/1991 | Doane et al. . |
| 4,998,105 | 3/1991 | Takekoshi et al. . |
| 5,009,044 | 4/1991 | Baughman et al. . |
| 5,015,057 | 5/1991 | Rumbaugh et al. . |
| 5,023,408 | 6/1991 | Murakami et al. . |
| 5,073,954 | 12/1991 | Van Tyne et al. . |
| 5,076,690 | 12/1991 | deVos et al. . |
| 5,096,282 | 3/1992 | Margerum et al. . |
| 5,103,080 | 4/1992 | Barkan . |
| 5,121,449 | 6/1992 | Shiba et al. . |
| 5,130,795 | 7/1992 | Rusche et al. . |
| 5,137,354 | 8/1992 | deVos et al. . |
| 5,196,835 | 3/1993 | Blue et al. .............................. 345/175 |
| 5,248,856 | 9/1993 | Mallicont .................................. 178/18 |
| 5,434,370 | 7/1995 | Wilson et al. ............................ 178/18 |

CALIBRATION OF GRAPHIC DATA-ACQUISITION TRACKING SYSTEM

TECHNICAL FIELD

This invention relates to a graphic data-acquisition system of the type wherein an expanse of electromagnetic radiation is created in close proximity to a writing surface for the purpose of tracking and following, for example, components such as writing and erasing instruments. In particular, the invention relates to such a system which is equipped with calibrator structure capable, inter alia, of reading information about such an expanse of radiation to aid in noting and adjusting the relative distance between the radiation expanse and the writing surface at various points distributed around the latter. The invention also relates, in the setting just described, to a novel method for monitoring such relative distance, and to providing tracking-useful timing information.

BACKGROUND AND SUMMARY OF THE INVENTION

U.S. Pat. No. 5,248,856 for CODE-BASED, ELECTRO-MAGNETIC-FIELD-RESPONSIVE GRAPHIC DATA-ACQUISITION SYSTEM by Mallicoat, issued Sep. 28, 1993, describes a graphic data-acquisition system with respect to which the calibrator of the present invention is an improvement, and is incorporated in this disclosure for illustration purposes. Accordingly, the full disclosure of that patent is hereby incorporated by reference into this disclosure.

That patented data-acquisition system takes the form of a code-based, electromagnetic-field-responsive (and preferably optically responsive) system employing an active pair of transceivers, each including a rotating, multi-facet scanning mirror, and a laser whose beam is thereby scanned across a writing-surface area for the purpose of tracking the position, and noting certain characteristics respecting, different write-effective components, such as those just mentioned above.

For such a system to offer the highest degree of accuracy and reliability, it is important that the expanse, or expanses, of radiation created by the swept laser beams have a known, and preferably uniform, distance relation to the writing-surface area throughout the entirety of that area. This concern is not only present at the time that such a system is first assembled, but is also important later when the system is mounted for use, or in the event that something, over time, causes the writing-surface structure to warp, etc., in order to enable a user of the system to become aware that recalibration is necessary to return the system's capability to the normal and intended initial accuracy.

A key object of the present invention is to provide novel structure and a related method which promotes easy and ready calibration of a system of the type like that just described, as well as calibration monitoring over time to assess if and when a positional change occurs between the laser's scanning expanse and different portions of the writing surface.

Proposed, therefore, in accordance with the structure of this invention, are plural, distributed radiation-interactive units, or objects, which, herein, are preferably radiation-reflective units mounted adjacent what might be thought of as the four corners of the writing-surface area, and which interact with scanned radiation from the laser beams to effect the creation of related analog data streams that are interpretable by a processor in the system to assess the location of the expanse(s) relative to the writing surface. The term "radiation-interactive" is used herein to recognize that a relatively wide range of such things could be employed successfully, including occluders, absorbers, active interceptors, as well as reflectors, such as the ones that we specifically discuss hereinbelow. The reflecting units, chosen for use in the specifically disclosed system, also function to aid in system timing control with respect to successive scanning sweeps of the laser beams, all for the purpose of aiding in the tracking function mentioned above.

In the data-acquisition system which is specifically disclosed herein, that includes the calibration features of the present invention, there are also included three other improvements which are generally illustrated and/or mentioned herein, and which form the bases, respectively, of three different companion U.S. patent applications. These three companion applications include: "MARKING SYSTEM WITH PEN-UP/PEN-DOWN TRACKING", filed on Nov. 5, 1993 by Scott E. Wilson, Samuel W. Mallicoat and Donald H. Zurstadt now U.S. Pat. No. 5,454,270, "OPTICAL-SCANNING SYSTEM EMPLOYING LASER AND LASER SAFETY CONTROL", U.S. Ser. No. 08/148,691, filed on Nov. 5, 1993, by Guy L. Williams, Timothy A. Jenness and Scott E. Wilson; and "GRAPHIC DATA-ACQUISITION SYSTEM UTILIZING LIGHT-SOURCE STRUCTURE WITH EXTRANEOUS-LIGHT FILTERING", U.S. Ser. No. 08/148,600, filed on Nov. 5, 1993, by Timothy A. Jenness and Scott E. Wilson. The entire disclosures of these three companion applications are hereby incorporated herein by reference.

The various objects and features which are offered and obtained by the present invention will become more fully apparent as the description which now follows is read in conjunction with the accompanying drawings.

DETAILED DESCRIPTION OF, AND BEST MODE FOR CARRYING OUT, THE INVENTION

Figure 1:
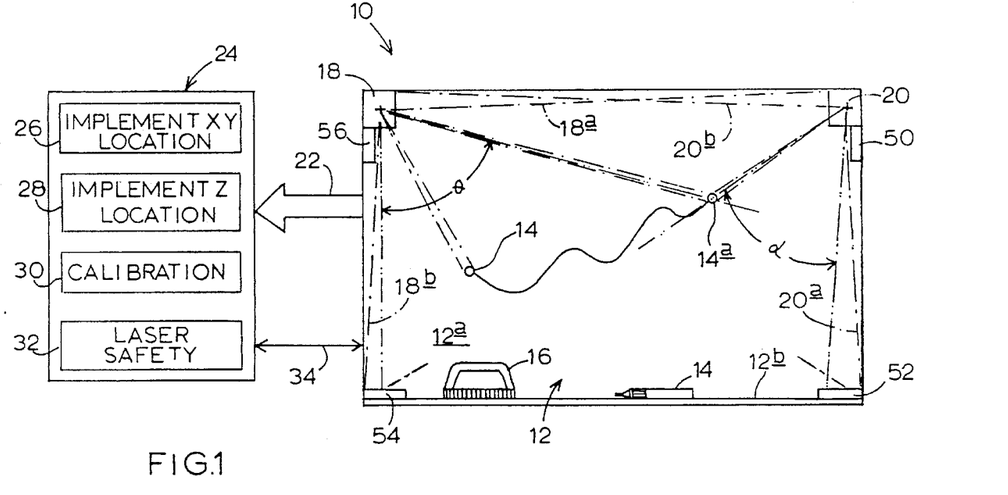
FIG. 1 is a front elevation, in schematic form, illustrating a graphic data-acquisition system including the calibration features of the present invention.

Turning attention now to the drawings, and referring first to FIG. 1, indicated generally at 10 is a graphic data-acquisition system including, as will be described, calibration features proposed in accordance with the present invention. Associated with system 10, as illustrated in FIG. 1, is a writing-surface area 12a of an upright, dry-erase whiteboard 12 which also includes an implement support ledge 12b on which rest two, mobile, write-effective components including a pen (writing implement) 14, and an eraser 16. Each of these two components is constructed with retroreflective code structure as described in the above-referenced '856 U.S. Pat. As what may be thought of as an end result, the system is intended to track the positions of components such as pen 14 and eraser 16 as each is moved over writing-surface area 12a to create or delete information, and to produce a tracking data stream which carries information such as component position on the writing surface area, as well as other characteristics, such as the fact that one is a pen, the other is an eraser, and perhaps information about pen color, writing angle, etc.

Two active transceiver structures 18, 20, which are alike in construction, and which are formed of components and circuitry that are of conventional and readily available commercial design, are located adjacent the upper corners of board 12. Each of these transceiver structures is also referred to herein as an electromagnetic-radiation-generating structure. Each includes a laser whose beam is swept in repeatable scan cycles by a multifacet, power-rotated scanning mirror, to create, in a generally planar zone, an expanse of radiation which lies in close proximity to writing-surface area 12a and preferably in a parallel planar relation to this writing-surface area. The laser in structure 18 sweeps in a counter-clockwise rotary direction in FIG. 1 to create a scanning expanse of radiation at least partially bounded by dash-dot lines 18a, 18b. The beam of the laser in structure 20 sweeps in a clockwise direction in FIG. 1 to define a scanning expanse of radiation at least partially bounded by dash-dot lines 20a, 20b. The scanning rate for each transceiver structure is the same, and herein is 83-scans-per-second.

As the '856 patent points out, certain substructure within each of transceiver structures 18, 20 responds to any return-response radiation that returns from a designated reflecting object within the scanning zone to effect a related data stream which is interpretable to track the position, and to note the character, of a write-effective component disposed in proximity to writing-surface area 12a. These tracking-interpretable data streams from structures 18, 20 are fed via data bus 22 to a processor 24 which includes a component portion labeled herein "IMPLEMENT X, Y LOCATION" that operates in accordance with the descriptive material provided in the '856 patent regarding a processor (40) shown in that patent.

Further incorporated with system 10 in accordance with improvements thereto described not only in this specification, but also described in the two, above-mentioned, pending, companion patent applications, within processor 24, are component portions 28, 30, 32 labeled, respectively, "IMPLEMENT Z LOCATION", "CALIBRATION", and "LASER SAFETY". The first-mentioned of the two above-mentioned companion applications relates to subject matter involving processor component portion 28, and the second-mentioned companion patent application relates to processor component portion 32. The present invention relates to processor component portion 30 included within processor 24. A part of CALIBRATION port/on 30, which is not specifically diagramed in FIG. 1, is a system clock. A multi-conductor cable structure 34 shown in FIG. 1 interconnects structures 18, 20 and processor 24 in respect of the operation described in the second-mentioned companion patent application relating to processor component portion 32, LASER SAFETY, and also in respect of a feature of the calibrator invention described in this application.

Still continuing with a description of what is shown in FIG. 1, further incorporated with system 10 in accordance with the present invention is radiation interactive structure including four specially designed reflector structures 50, 52, 54, 56 located herein essentially adjacent what might be thought of as the four corners of writing-surface area 12a. These structures are also referred to herein as objects which are employed, as will be explained, in calibrating the locations of the planes of radiation wherein the laser beams are scanned, as well as in establishing certain timing information regarding laser-beam angular position.

While, following a full reading of the disclosure in this specification, those skilled in the art will recognize that important features of this invention can be implemented in a setting where but a single reflective object, like object 50, is associated with each laser, we have chosen to implement the invention with the four units 50, 52, 54, 56, placed as shown, with units 50, 52, 54 interacting, as will be explained, with the swept beam of the laser in transceiver structure 18, and with units 52, 54, 56 interacting with the swept beam of the laser in transceiver structure 20. While we are illustrating the present invention in a system that utilizes swept-beam lasers, radiation expanses could exist in another kind of graphic data-acquisition system in which zones of radiation exist at all times rather than at swept times.

Reflections from units 50, 52, 54, 56, resulting from activity which will be explained later, are picked up by the respective associated transceiver structures to generate analog data streams interpretable by the calibration component of processor 24 to aid in monitoring the positional locations of the planes of swept radiation relative to writing-surface area 12a, and in addition, to aid in component tracking as mentioned earlier. Accordingly, at this point, let us turn attention now to descriptions of units 50, 52, 54, 56 per se, and thereafter to how they work in the system of the invention.

Calibration strips 50, 52, 54 and 56 are preferably structurally identical, though despite such identity, have orientation and system-position-specific features which uniquely enable these strips to offer differentiated performances in the system. This will be explained further. By making the strips identical, manufacturing is simplified, and use of the strips is easier because, by taking advantage of the differentiated performance capability just mentioned, and by utilizing a "symmetry" approach toward specific placement of the strips, positioning of the strips is interchangeable.

In designing the reflective configurations of the strips, there are several fundamental objectives. First, each scanning beam preferably interacts, or potentially interacts, with three reflectors or "calibration strips". A first strip, for example 52, is positioned near a lower corner adjacent one side of the writing surface directly below scanner 20 (first position). A second strip 54 is positioned diagonally from scanner 20 near the other lower corner of the writing surface (second position). A third strip 56 is positioned across from the scanner near the opposite, upper corner and side of the writing surface (third position). The strips are preferably designed so that, when the scanner is properly aligned, its beam will only interact with the first and third strips, i.e., those strips which are positioned near the beginning and end of a scanning sweep (near the opposite, extreme sides of the writing-surface area as defined by the angular sweep of a beam). The first and third strips are preferably positioned so that the beam impinges on a front surface of the strip at approximately a perpendicular angle. The second strip, the one which is located diagonally across from the scanner, receives the beam at an angle substantially less than ninety (90) degrees depending on the dimensions of the board, typically between thirty (30) and sixty (60) degrees, and preferably 38.8-degrees. It is preferable for the second strip to only interact, i.e., produce a reflective signal with the beam, when the beam is out of alignment. Thus, an important objective of the present invention is for the second strip to be "invisible" under normal operation so that it does not interfere with normal X, Y and Z tracking of an implement such as pen 14. These different operational features of what have just been called the "first", "second" and "third" strips, generally illustrate the differentiated performance capability mentioned earlier.

Another important objective for a calibration strip is to effect the generation of a quantitative data stream relating to the height of the beam above the board when the strip is located in either of the first or third positions, i.e., when the beam impinges on the front face of the strip at an angle of approximately ninety (90) degrees.

Figure 2:
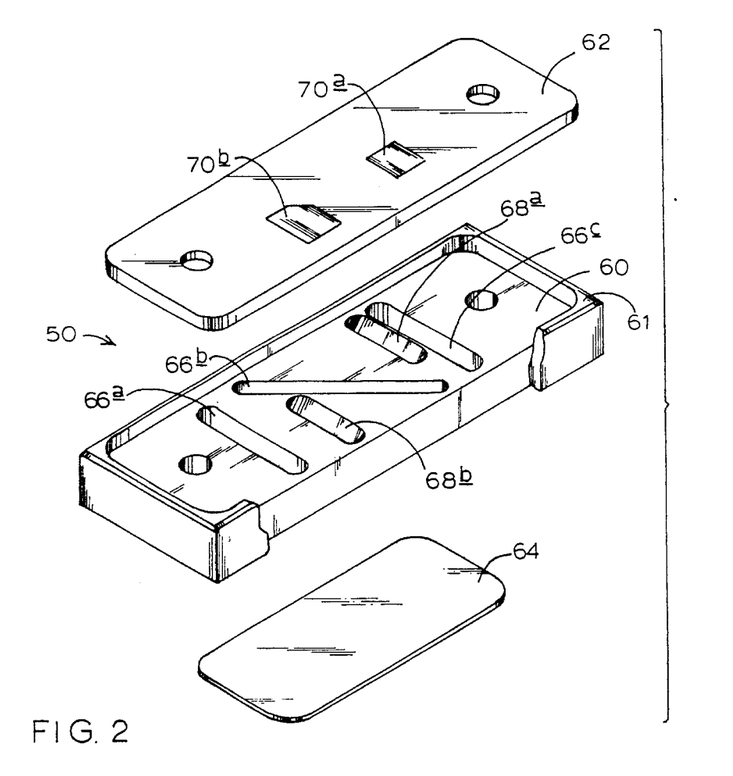
FIG. 2 is an exploded, isolated, perspective view of a calibration strip in accordance with a preferred embodiment of the present invention.

With the above objectives in mind, FIGS. 2–5 illustrate a preferred calibration strip design—using strip 50 as an example. FIG. 2 shows an exploded perspective view of a calibration strip including three primary components, namely, a template portion 60 sandwiched between a laser-transparent face plate 62 and a retroreflector 64.

The template portion 60 generally has two sets of slots, the first set designated 66 and the second set designated 68.

The slots in the first set of slots, 66a, 66b and 66c, are cut generally in a "Z" pattern or "N" pattern, depending on one's point of view. In the remainder of the specification, we will refer to a "Z" pattern. Slots 66a, 66b and 66c are cut with walls generally perpendicular to reflector 64 so that when the laser beam impinges perpendicularly on the face of the strip, the beam will pass completely through the slots and be reflected back from reflector 64 resulting in a detectable analog signal. The walls of slots 66a, 66b and 66c are preferably non-reflective so that if strip 50 were positioned in the second position relative to scanner 20, diagonally from the scanner so that the laser beam impinges upon the face of the strip at less than a ninety (90) degree angle, the "Z" pattern slots will not produce any signal.

The "Z" configuration of slots 66a, 66b and 66c is also useful, as will be explained in more detail below, for providing quantitative data correlating to the height of the beam above the writing surface. Collectively, slots 66a, 66b and 66c will produce a triplicate signal (i.e., three reflectance events) when the beam scans across the face of the strip substantially perpendicularly. The timing of the second reflectance event relative to the first and third reflectance events can be correlated to the position of the beam relative to the lengthwise edges of the strip.

In contrast, slots 68a and 68b in the second set are angled so that they will only allow reflectance of the laser beam if it impinges on the face of the strip at an angle substantially less than ninety (90) degrees. The walls of these slots are substantially nonreflective. Face plate 62 is transmissive except for mask portions 70a and 70b which are dimensioned and located so that they cover selected portions of slots 68a and 68b respectively. With masks 70a and 70b covering portions of slots 68a and 68b, a central zone is defined within which the beam may scan at an angle substantially less than ninety (90) degrees without being reflected by reflector 64.

Figure 3:
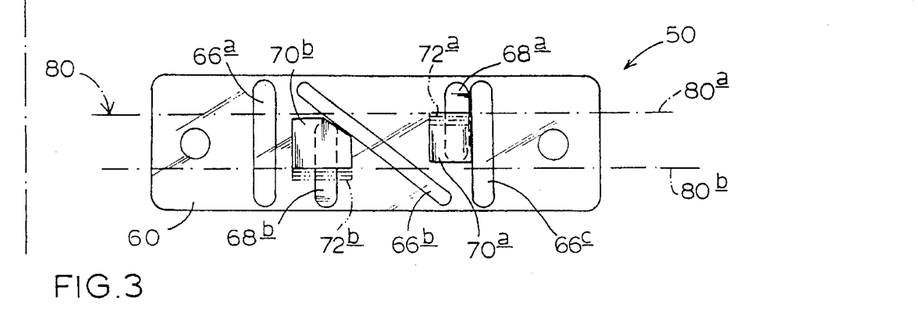
FIG. 3 is a partial, top plan view of the calibration strip shown in FIG. 2.

FIG. 3 is a top plan view of calibration strip 50. It can be seen in FIG. 3 with respect to angled slots 68a and 68b that masks 70a and 70b define a zone 80 within which the beam may scan without being reflected, assuming of course the beam impinges the face of the strip at an angle substantially less than ninety (90) degrees so that it is not reflected through the "Z" pattern slots. Sets of variably dimensioned masks, for example 72a and 72b, are supplied with each calibration strip so that the zone 80 can be appropriately modified depending on the particular application.

Figure 4:
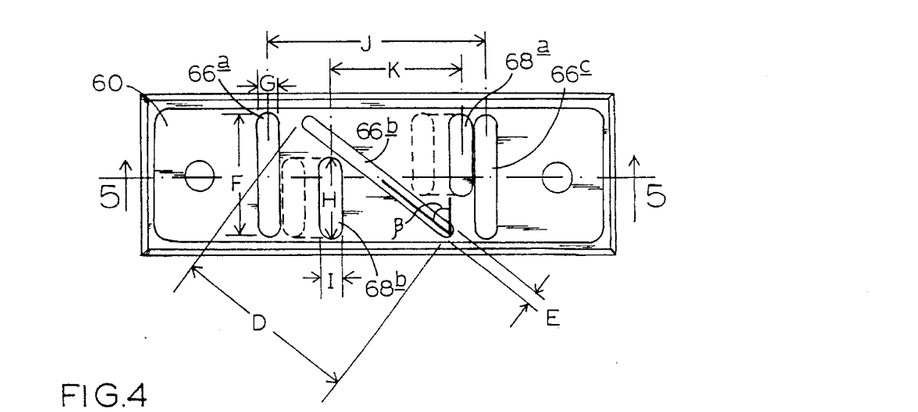
FIG. 4 is a full, top plan view of the calibration strip shown in FIG. 2.

FIG. 4 shows a top plan view of template portion 60 without face plate 62. Slot 66b preferably has a length D of 0.713-inches and a width E of 0.062-inches. Slots 66a and 66c preferably have a length F of approximately 0.500-inches and a width G of 0.093-inches. Angled slots 68a and 68b preferably have a length H of 0.330-inches and a width I of 0.062-inches. Slots 66a and 66c are spaced apart by a distance J of 0.906-inches. Slots 68a and 68b are spaced apart by a distance K of 0.540-inches. The axis of slot 66b forms an angle $\beta$ with a line parallel to the axes of the other slots of approximately fifty-five (55) degrees.

Figure 5:
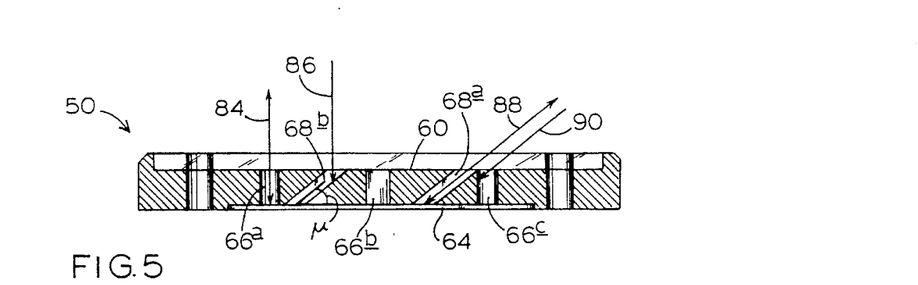
FIG. 5 is a cross-sectional side view of the calibration strip shown in FIG. 4.

FIG. 5 is a cross-sectional view of calibration strip 50, taken as if generally from the bottom side of FIG. 4, and along the longitudinal axis of the strip, which axis is illustrated in FIG. 4 by a horizontal dash-dot line. The walls of slots 66a, 66b and 66c are perpendicular to face plate 62 and retroreflector 64. Thus, a laser beam, such as beam 84, will be reflected through slots 66a, 66b and 66c when the beam path is substantially perpendicular to retroreflector 64. In contrast, a perpendicularly impinging beam, such as beam 86, will not be reflected though slot 68b because the beam will hit the non-reflective wall of the slot. Laser beams 84 and 86 approach the strip from an angle which would be expected when the strip is placed in either of the first or third positions relative to a scanner, i.e., at the beginning or end of the scanning cycle (near the opposite extreme sides of the writing-surface area as defined by the angular sweep of a beam).

Alternatively, when the calibration strip is placed in the second position, i.e., diagonally from the scanner, laser beam paths 88 and 90 will form an angle $\mu$ of 38.8-degrees with reflector 64. A laser beam, such as beam 90, hits the wall of slot 66c and is not reflected back. A beam, such as beam 88, passes completely through slot 68a and is reflected back from reflector 64.

Each of the calibration strips can thus be characterized as having differentiated-angle reflectance characteristics. By employing what can be thought of as "end-for-end" symmetry placement of the four strips employed in system 10, the strips interact differently with the laser beams to accomplish the important objects of this invention.

Strips 50, 56 are positioned and oriented so as to interact only, under all circumstances, with the beams from scanners 18, 20, respectively. Strips 52, 54 are disposed, with end-for-end, mirror-image symmetry, to interact only with the beams from scanners 20, 18, respectively, but only under circumstances of normal, proper scanner alignment relative to writing-surface area 12a. Strips 52, 54, however, are positioned and oriented such that the angular dispositions of their slots corresponding to slots 68a, 68b in strip 50 "allows" them to interact with the beams from scanners 18, 20, respectively, if the corners of the writing-surface area near them are sufficiently out of alignment (out of plane) in either direction. Short, angled dash-dot lines near these strips in FIG. 1 illustrate this situation of possible interaction. Thus, these two strips have the capability in the system of interacting with beams from both scanners, in order to provide certain important alignment information, and this dual-interaction capability comes from the unique, differentially-angled-slot, common construction for all of the calibration strips. This differential angularity, of course, has parameters dependent upon system configurations, such as writing-surface area aspect ratio, desired relative positional locations for the strips, etc.

Figure 8:
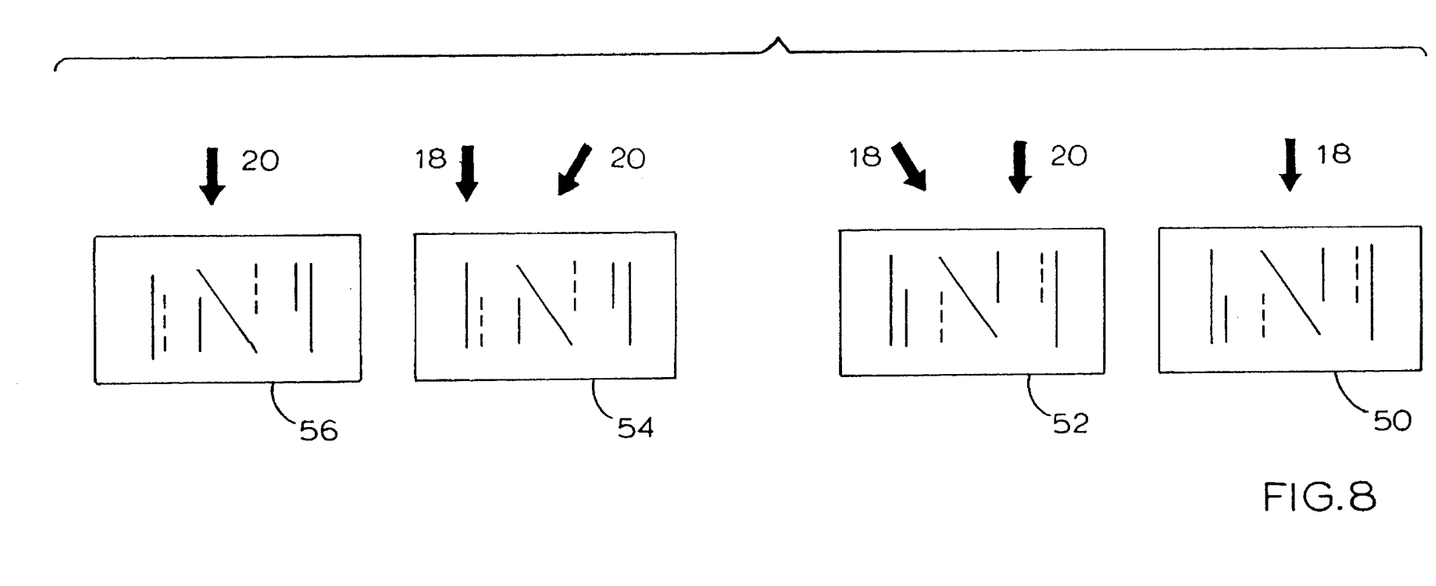
FIG. 8 is a developed (laid out), highly schematic view illustrating the relative orientations and positional relations of four calibration strips which are employed in the system of FIG. 1.

In the context of the discussion immediately above relating to the operations of the four calibration strips in system 10, it should be apparent that each of these strips presents what can be thought of as its "operative face" to different edge points of writing-surface area 12a, with each of these faces essentially facing normal to the plane of the writing-surface area. FIG. 8 is what is referred to herein as a developed, or laid out, view to illustrate how each of these calibration strips, respectively, presents its operative face to such an edge point, and reading from left to right in FIG. 8, one can imagine that this developed view has been derived from rotationally viewing these operative faces in, essentially, the plane of the writing-surface area, beginning, in a counter-clockwise sense (relative to the plane of FIG. 1), with calibration strip 56. In other words, for one to view rotationally the presentations of these strips in the plane now being described, and in a counter-clockwise sense in FIG. 1 beginning with strip 56, one would see, in order, the faces of strips 56, 54, 52 and 50.

Schematically presented on the respective operative faces of each of these four strips in FIG. 8 are solid and dashed lines that represent the slots which have been discussed above, through which slots beams from the scanned lasers may or may not pass to be reflected for the purpose of generating positional and tracking information according to this invention. For the purpose of illustration herein, strips 56 and 54 are shown oriented in FIG. 8 in the same manner as is illustrative strip 50 in FIGS. 3, 4 and 5 of the drawings. Strips 52, 50 are oriented in what is referred to herein as a symmetrically and mirror-image, end-to-end, reversed relationship. Given this situation, what results is a condition of angular positioning for the slots which in no way affects the angular positions of the slots in the "Z" pattern, but which reverse-orients the angularity of the shorter slots, such as previously mentioned slots 68a, 68b. More specifically, and relative to the plane of FIG. 8, these shorter slots, each represented by a pair of lines one of which is solid and the other of which is dashed (to indicate the opposite ends of the slots relative to the opposite faces of the respective calibration strips), are positioned so that a laser beam angled downwardly and toward the left regarding the plane of FIG. 8 can pass through the slots in strip 54, and if angled downwardly and toward the right respecting the plane of this figure, can pass through these shorter slots in strip 52. Inasmuch as strips 50, 56 can only see beams from lasers 18, 20, respectively, which beams are normal to the operative faces of these strips, the passage of a laser beam through the shorter slots is not an issue. With respect to strip 54, the beam from the laser in scanner 18 can pass through the slots that form the "Z" pattern, and the beam angularly directed toward this strip from scanner 20 can, if it is positioned to miss the masks that are provided according to this invention, pass through the shorter slots in this unit. With regard to strip 52, the beam from scanner 20 can pass through the slots forming the "Z" pattern in this strip, and the beam from scanner 18 can, assuming it misses the edges of the masks described earlier, pass angularly through the short slots in this unit. Thus, the two patterns of slots provided in strips 54, 52 function, relative to the beams from scanners 18, 20, in a mutually exclusive fashion.

Those skilled in the art will recognize that the relative orientations and positionings depicted in, and described with reference to, FIG. 8 can take different forms if desired.

Figure 6:
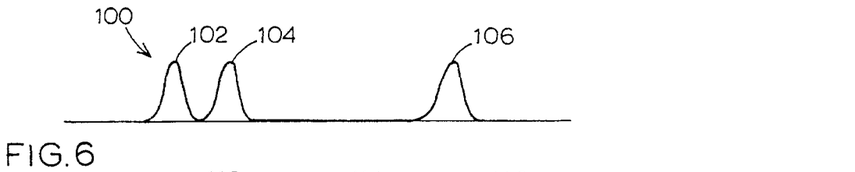
FIG. 6 is a graphic plot showing analog data generated with the preferred calibration strip of the present invention, as a function of time.
Figure 7:
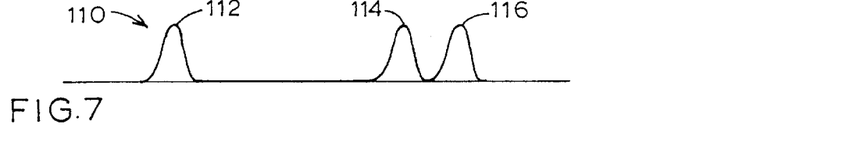
FIG. 7 is a graphic plot showing analog data generated with the preferred calibration strip of the present invention, as a function of time.

FIGS. 6 and 7 demonstrate variations in the analog signal produced by scanning over the "Z" reflectance pattern. With reference first to FIG. 3, assuming the beam scans lengthwise from left to right across the face of strip 50 along line 80a, the analog signal 100 resulting from the interaction between the laser beam and the "Z" reflectance pattern, is shown in FIG. 6. The first peak 102 in FIG. 6 corresponds to beam interaction with reflectance slot 66a. Peak 104 corresponds to beam interaction with diagonal reflectance slot 66b. Peak 106 corresponds to beam interaction with reflectance slot 66c.

Similarly, in FIG. 7 the analog plot 110 corresponds to scanning beam interaction with the "Z" pattern, this time along line 80b in FIG. 3. Peak 112 results from the interaction between the beam and reflectance slot 66a. Peak 114 results from interaction between the beam and reflectance slot 66b. Peak 116 results from interaction between the beam and slot 66c.

Thus, it can be seen that as the beam path moves relative to the lengthwise edges of the strip, along the Z axis shown in FIG. 3, the second of three peaks generated by beam interaction with the "Z" pattern on strip 50, changes its position in time relative to the first and third peaks which remain constantly spaced. The proximity of the second peak relative to the first and third peaks, can therefore be interpreted to provide quantitative information concerning the height of the radiation expanse above the writing surface.

It should be noted that, although the triplicate signal producing reflectance pattern described above is preferred, a double signal or even a single signal generating system could also be employed. A double signal could for example, be produced by beam interaction with slot 66c and slot 66b. Movement of the scanning path from line 82 to line 80 in FIG. 3, would then produce the amplitude plots shown in FIGS. 6 and 7 respectively minus peaks 106 and 116. Therefore, the distance between the two peaks, 102 and 104 in FIG. 6, and 112 and 114 in FIG. 7, would correlate to the relative positions of the beams along the Z axis.

Theoretically, the same type of quantitative information could be obtained with a single diagonal slot such as 66b, assuming that there is a reference timing point along the scan which remains constant regardless of the positioning of the plane of the scan along the Z axis. Although, a single or double signal pattern may be used in theory, it is believed that a more accurate and reliable quantitative determination of the Z axis location of the beam is practically obtained with a triplicate signal pattern such as the "Z" pattern described above.

Now returning to the dual scanner graphic-data-acquisition system illustrated in FIG. 1, it can be seen that each scanner 18 and 20 produces a laser beam which at least potentially interacts with three calibration strips in order to achieve the objectives of the invention regarding quantitative tracking of the radiation expanse relative to the writing surface. Under normal operation when the beam produced from laser 20 is properly aligned, the beam interacts with the reflective "Z" patterns on first and third calibration strips 52 and 56 to produce data which quantitatively relates to the height of the beam relative to the writing surface. The "Z" pattern of slots on calibration strip 54 in the second position will not interact with the beam produced by scanner 20 because the beam will hit the non-reflective walls of those slots. However, if the beam goes out of alignment, i.e., too high or too low above the writing surface, the beam produced by scanner 20 will interact with either angled slot 68a or angled slot 68b, thus producing an error message to alert the operator that the beam is out of alignment. Depending on which angled slot interacts with the beam, the system is capable of informing the operator whether the plane of the beam is too high or too low. Different specific structures/ techniques can be used for this purpose. For example, one could use a timing approach, or a differentiated, specifically placed photodiode approach.

Calibration strips 50, 52, 54 and 56 are also used as references for the purpose of calculating the X, Y location of the writing implement 14a. As disclosed in detail in the '856 patent, X, Y location of the implement 14a is calculated by a triangulation function based on two angles, for example α and θ in FIG. 1. Angle α in FIG. 1 directly correlates to the time which it takes for the beam from scanner 20 to scan from a reference point on strip 52 to implement 14 at position 14a. Similarly, angle θ directly relates to the time which it takes for the beam from scanner 18 to scan from a reference point on strip 54 to implement 14 at position 14a. Thus, as has been stressed, it is apparent that calibration strips 50, 52, 54 and 56 are dually functional for the purpose of monitoring the height of the scanning beams above the writing surface, and for the purpose of providing reference points from which to determine angles for calculating the X, Y location of the writing implement.

Further, in the event that an error in scanning alignment is detected, the processor may be programmed to supply a correction signal via cable structure 34 to scanners 18 and 20, thereby automatically correcting and maintaining the desired positioning of the radiation expanse relative to the writing surface.

The particular calibration strip configuration described above allows a single strip to perform different functions for different scanners. For example, still referring to FIG. 1, calibration strip 54 is in the first position relative to the beam generated by scanner 18, but is in the second position relative to the beam produced by scanner 20. Similarly, calibration strip 52 is in the first position relative to the beam generated by scanner 20, but is in the second position relative to the beam generated by scanner 18. Accordingly, two scanners can be calibrated with a total of four calibration strips, even though each scanner requires three potentially interactive strips which, when the beams are properly aligned, should only interact with the beams at the beginning and the end of each scan cycle.

Accordingly, the system of the invention offers significant safety features which substantially eliminate from concern the possibility that someone near the system would experience eye damage. Variations and modifications well within the skill of those skilled in the art may, of course, be made without departing from the spirit of the invention.

It is desired to secure and claim by Letters Patent:

1. In a graphic data-acquisition system for tracking the position of a writing implement relative to a writing surface, a calibrator comprising electromagnetic-radiation-generating structure disposed adjacent the writing surface and operable to produce an expanse of radiation in a substantially planar zone near the writing surface, at least one object located at a first point remote from the structure, including one or more regions in the zone for interacting with the expanse, and a processor for monitoring the character of interaction between said structure and said one or more regions, and determining the position of the expanse relative to the writing surface.

2. The calibrator of claim 1 further comprising a clock, wherein the expanse produced by the radiation-generating structure derives from a scanning electromagnetic beam with a known cycle time, so that the time elapsed between one event when the beam interacts with the object and another event when the beam interacts with the implement, directly correlates to the magnitude of an angle formed by a first line through the structure and the object and a second line through the structure and the implement.

3. The calibrator of claim 1 wherein the object is reflective.

4. The calibrator of claim 1 further comprising a second object located at a second point remote from the structure, including one or more regions in the zone for interacting with the expanse, wherein the expanse produced by the radiation-generating structure derives from a scanning electromagnetic beam with a repeatable sweep cycle over an area between first and second boundaries of the writing surface, the first point intersecting the path of the beam near the first boundary of the writing surface and the second point intersecting the path of the beam near the second boundary of the writing surface.

5. The calibrator of claim 4 wherein the beam is a laser.

6. The calibrator of claim 4 further comprising a third object located at a third point remote from the structure, including one or more light-interactive regions in the zone for interacting with the expanse, wherein the third point intersects the path of the beam intermediate said first and second boundaries of the writing surface.

7. The calibrator of claim 6 wherein the third object only interacts with the expanse if the expanse is out of proper alignment, so that during normal operation the calibrator does not interfere with implement tracking.

8. The calibrator of claim 7 wherein the three objects have identical reflective configurations.

9. The calibrator of claim 7 wherein each object has a face, a first reflective pattern and a second reflective pattern, the first pattern being interactive with the beam only when the beam is approximately normal to the face of the object, and the second pattern being interactive with the beam only when the beam impinges upon the face of the object to form an angle of between approximately thirty (30) to sixty (60) degrees.

10. In a graphic data-acquisition system for tracking the position of a writing implement relative to a writing surface, a calibrator comprising electromagnetic-radiation-generating structure disposed adjacent the writing surface and operable to produce an expanse of radiation in a substantially planar zone near the writing surface, and at least three objects disposed in the zone, collectively capable of interacting with the radiation to effect the production of data allowing the position of the zone to be monitored relative to the writing surface.

11. In a graphic data-acquisition system for tracking the position of a writing implement relative to a writing surface, a calibrator comprising electromagnetic-radiation-generating structure disposed adjacent the writing surface and operable to produce an expanse of radiation in a substantially planar zone near the writing surface, and means for interacting with the expanse and monitoring the position of the expanse relative to the writing surface.

12. The calibrator of claim 11 wherein the expanse produced by the radiation generating structure derives from a scanning electromagnetic beam with a repeatable sweep cycle over an area between first and second boundaries of the writing surface, and the means positively interacts with the beam only near the first and second boundaries of the writing surface when the expanse is properly aligned in the zone.

13. A calibration strip for use in a graphic data-acquisition system employing a first scanner and a second scanner located at different locations around the perimeter of a writing surface for the purpose of tracking the location of a writing implement relative to the writing surface, the strip comprising a template including a first beam-interactive pattern and a second beam-interactive pattern, the patterns being configured so that the strip can be positioned around the perimeter of the writing surface in such a way that a beam from the first scanner interacts with the first pattern and not with the second pattern, and a beam from the second scanner interacts with the second pattern and not with the first pattern.

14. The strip of claim 13 wherein each pattern takes the form of at least one slot cut at an angle relative to a front face of the strip, the angle of the slot in the first pattern being different from the angle of the slot in the second pattern, so that a beam impinging on the front face of the strip will only interact with one of the patterns depending on the angle of incidence formed between the beam and the front of the strip.

15. In a graphic data-acquisition system for tracking the position of a writing implement relative to a writing surface by producing and interpreting an analog data stream from interaction between an expanse of electromagnetic radiation and the writing implement, a method of monitoring the relative distance between the expanse and the writing surface comprising positioning a radiation-interactive structure in a substantially planar zone near the writing surface at the desired location for the expanse, producing signals from interaction between the expanse and the structure, wherein the signals vary depending on the relative distance between the writing surface and the expanse, and interpreting the signals to provide information concerning the relative distance between the expanse and the writing surface.

16. In a graphic data-acquisition system for tracking the position of a writing implement relative to a writing surface, a calibrator comprising electromagnetic-radiation-generating structure disposed adjacent the writing surface and operable to produce an expanse of radiation in a substantially planar zone near the writing surface, at least one object located at a first point in the zone remote from the structure, and means for interacting with the expanse to produce quantitative data correlating to the relative distance between the expanse and the writing surface at the first point, and a processor for receiving and processing the data and allowing the position of the expanse relative to the writing surface to be monitored.

17. The calibration strip of claim 13 wherein the first scanner produces a first beam and the second scanner produces a second beam, the first pattern interacting with the first beam only when the first beam impinges on the pattern to form an angle of approximately 90°, the second pattern interacting with the second beam only when the second beam impinges on the pattern to form an angle of substantially less than 90°.

18. The calibration strip of claim 13 wherein each pattern is responsive on a mutually exclusive basis to a different one only of the beams.

\* \* \* \* \*

UNITED STATES PATENT AND TRADEMARK OFFICE
CERTIFICATE OF CORRECTION

PATENT NO. : 5,583,323

DATED : December 10, 1996

INVENTOR(S) : Donald H. Zurstadt, Samuel W. Mallicoat and Scott E. Wilson

It is certified that error appears in the above-identified patent and that said Letters Patent is hereby corrected as shown below:

In the abstract, line 4, after "adjacent" insert --a writing surface and is operable to--.

Signed and Sealed this

Eleventh Day of March, 1997

Attest:

BRUCE LEHMAN

Attesting Officer    Commissioner of Patents and Trademarks